United States Patent
Sibilli et al.

(10) Patent No.: US 12,228,035 B2
(45) Date of Patent: Feb. 18, 2025

(54) HYBRID TURBOFAN ENGINE FOR AN AIRCRAFT, COMPRISING A MOTOR/GENERATOR COOLED BY HEAT PIPES

(71) Applicants: SAFRAN, Paris (FR); SAFRAN AIRCRAFT ENGINES, Paris (FR)

(72) Inventors: Thierry Sibilli, Moissy-Cramayel (FR); Vincent François Georges Millier, Moissy-Cramayel (FR); Loïc Paul Yves Guillotel, Moissy-Cramayel (FR)

(73) Assignees: SAFRAN, Paris (FR); SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/261,443

(22) PCT Filed: Jan. 7, 2022

(86) PCT No.: PCT/FR2022/050048
§ 371 (c)(1),
(2) Date: Oct. 10, 2023

(87) PCT Pub. No.: WO2022/152998
PCT Pub. Date: Jul. 21, 2022

(65) Prior Publication Data
US 2024/0068377 A1 Feb. 29, 2024

(30) Foreign Application Priority Data
Jan. 15, 2021 (FR) ........................................ 2100373

(51) Int. Cl.
*F01D 15/10* (2006.01)
*B64D 27/24* (2006.01)
(Continued)

(52) U.S. Cl.
CPC ............. *F01D 15/10* (2013.01); *B64D 27/24* (2013.01); *F02C 7/12* (2013.01); *F02K 3/115* (2013.01);
(Continued)

(58) Field of Classification Search
CPC . F05D 2260/208; B64D 31/18; B64D 35/022; B64D 35/026; B64D 27/026; F02C 6/14; F02C 7/12; F01D 15/10
See application file for complete search history.

(56) References Cited

U.S. PATENT DOCUMENTS 3,842,596 A * 10/1974 Gray .................... F28D 15/0208
165/104.25
10,676,205 B2 6/2020 Niergarth et al.
(Continued)

FOREIGN PATENT DOCUMENTS

FR 3080607 A1 11/2019

OTHER PUBLICATIONS

International Search Report for issued in Application No. PCT/FR2022/050048 dated Mar. 29, 2022.
Written Opinion for PCT/FR2022/050048 dated Mar. 29, 2022.

*Primary Examiner* — Gerald L Sung
(74) *Attorney, Agent, or Firm* — McDonald Hopkins LLC

(57) ABSTRACT

A hybrid turbofan engine for an aircraft, comprising a fan, an electric motor/generator and a gas generator, the engine comprising, between the fan and a splitter that separates the flows, an internal wall for delimiting an air duct, situated upstream of inlet guide vanes of a primary duct, and, upstream of outlet guide vanes, an internal upstream wall for delimiting a secondary duct, the motor/generator having a stator carried by a stator support fixed to a stator part of the engine. According to the invention, a plurality of heat pipe for cooling the motor/generator are provided, each heat pipe having an evaporation section fixed to the stator support, and (Continued)

a condensation section fixed to the internal wall or the internal upstream wall.

10 Claims, 4 Drawing Sheets

(51) Int. Cl.
    *F02C 7/12*     (2006.01)
    *F02K 3/115*     (2006.01)
    *B64D 27/02*     (2006.01)
    *F01D 9/04*     (2006.01)
    *F02K 3/06*     (2006.01)

(52) U.S. Cl.
    CPC ............ *B64D 27/026* (2024.01); *F01D 9/041* (2013.01); *F02K 3/06* (2013.01); *F05D 2260/208* (2013.01)

(56) References Cited

U.S. PATENT DOCUMENTS

| | | | |
|---|---|---|---|
| 10,842,044 B2 | 11/2020 | Snyder | |
| 2005/0050877 A1* | 3/2005 | Venkataramani | F02C 7/047 60/39.093 |
| 2008/0053100 A1* | 3/2008 | Venkataramani | F02C 7/14 60/772 |
| 2008/0159852 A1* | 7/2008 | Stephenson | F01D 5/046 415/178 |
| 2014/0165570 A1* | 6/2014 | Herring | F02C 7/14 60/730 |
| 2017/0175630 A1* | 6/2017 | Sibilli | F01D 25/02 |
| 2018/0050811 A1* | 2/2018 | Niergarth | B64D 27/18 |
| 2018/0066538 A1* | 3/2018 | Radomski | F01D 9/042 |
| 2018/0216535 A1* | 8/2018 | Hill | F02C 7/16 |
| 2019/0014687 A1* | 1/2019 | Snyder | B64D 33/08 |
| 2020/0023982 A1* | 1/2020 | Kupratis | F02C 6/00 |
| 2020/0049071 A1* | 2/2020 | Heenen | F02C 7/047 |
| 2021/0152052 A1* | 5/2021 | Haran | H02K 9/20 |

* cited by examiner

HYBRID TURBOFAN ENGINE FOR AN AIRCRAFT, COMPRISING A MOTOR/GENERATOR COOLED BY HEAT PIPES

CROSS-REFERENCE TO RELATED APPLICATIONS

This is a National Stage application of PCT international application PCT/FR2022/050048, filed on Jan. 7, 2022, which claims priority from French Patent Application No. 21 00373, filed on Jan. 15, 2021, both which are incorporated herein by reference in their entirety.

TECHNICAL FIELD

The present invention relates to the field of aircraft turbine engines, and in particular to hybrid designs implementing thermal power as well as electric power to drive the fan in rotation.

PRIOR ART

For example, such a hybrid aircraft turbine engine design is known from the document FR 3 080 607 A1. It should be reminded that the hybrid propulsion of an aircraft includes an internal combustion engine, also called gas generator, whose thermal power drives a fan, either directly via an engine shaft, or indirectly using a speed reducer coupled to this engine shaft. The hybrid propulsion also includes an electric generator/motor, connected to an electrical energy storage via a dedicated electrical network. The electric generator/motor may be used, in a first operating mode, as an electric motor which drives the fan in rotation, and, in a second operating mode, as an electric generator.

This hybrid propulsion architecture enables a purely electric flight wherein the fan of the turbine engine is driven in rotation by the electric generator/motor, whereas the gas generator is stopped. A purely thermal flight is also possible by driving the fan only with the gas generator, whereas the electric generator/motor is then in generator operating mode. In this case where the electric generator/motor no longer operates as a motor, but as an electric generator, the rotation of the fan drives the generator which recharges the electric energy storage, usually formed by one or more batter(y/ies). A hybrid flight is also possible, wherein the fan is driven in rotation by both the gas generator and the generator/motor.

While the implementation of an electric power, in addition to the existing thermal power, confers numerous advantages on the resulting hybrid turbine engine, there is still a problem of thermal management of the generator/motor. Indeed, this electrical component is likely to release a large amount of heat, which should be dissipated as best as possible to guarantee high performances and reliability of the generator/motor.

Consequently, there is a need to associate the generator/motor with effective, reliable and compact cooling means, which do not complicate too much the already particularly dense design of the hybrid turbine engine.

DISCLOSURE OF THE INVENTION

To address this need, an object of the invention is a hybrid turbofan engine for an aircraft, comprising a fan, an electric generator/motor, and a gas generator comprising a combustion chamber, the turbine engine being designed so that the rotation of the fan is ensured by the electric generator/motor and/or by the gas generator, the turbine engine comprising a flow splitter nozzle from which extend, downstream, a primary flow path equipped at its inlet with inlet guide vanes, and a secondary flow path equipped with outlet guide vanes, the turbine engine comprising, between the fan and the flow splitter nozzle, an inner boundary wall of an air flow path, located upstream of the inlet guide vanes of the primary flow path, and also comprising, upstream of the outlet guide vanes, an inner upstream boundary wall of the secondary flow path, the generator/motor including a rotor, and a stator carried by a stator support fastened to a stator portion of the turbine engine.

According to the invention, the hybrid turbine engine further includes a plurality of heat pipes for cooling the electric generator/motor, each heat pipe including an evaporator section fastened on the stator support of the generator/motor, as well as a condensation section fastened on the inner boundary wall of the air flow path or on the inner upstream boundary wall of the secondary flow path, each heat pipe being in the form of a tube whose opposite end portions are respectively formed by the condensation section and by the evaporation section.

The invention enables the thermal management of the generator/motor using heat pipes, making up effective, reliable and compact cooling means. Thus, the heat released by the generator/motor, transferred directly in the stator support of this generator/motor, is pumped by the heat pipes. Afterwards, this heat is evacuated radially outwards in one or more cooler area(s), at the inner boundary wall of the air flow path and/or at the inner upstream boundary wall of the secondary flow path, where the condensation sections of the heat pipes are fastened.

Thanks to the use of heat pipes, the invention allows increasing the performances of the turbine engine, without carrying out any specific air drawing. Indeed, it should be reminded that a heat pipe is a closed/passive system which, by taking advantage of the phase changes of a heat-transfer fluid, allows drawing heat from one location and redistributing it at another location without using a pump or another mechanical artefact, consuming energy. The operation is such that a liquid is enclosed in a tube which is usually made up of three portions, namely the evaporation section, the condensation section, and the adiabatic area. At the evaporation section, the liquid adopts its gaseous form and flows towards the condensation section where it liquefies again. Afterwards, the liquid is brought back towards the evaporation section thanks to the capillary network which serves as a motor of the heat pipe. Thus, the condensed liquid returns back to the hot end, called the evaporation end, by capillarity. Thus, with a heat pipe, the heat is transferred from the hot portion to the cold portion by evaporation of the liquid phase and condensation of the vapour in the cold portion of the heat pipe.

The axial location of the condensation sections of the heat pipes, upstream of the inlet guide vanes also called IGV vanes (standing for "Inlet Guide Vane"), and/or upstream of the outlet guide vanes also called OGV vanes (standing for "Outlet Guide Vane"), allows for a very efficient operation of the heat pipes, thanks to the particularly cool air which licks the condensation sections in these areas of the turbine engine.

Moreover, the invention, which therefore breaks with conventional designs with cooling of the generator/motor by an air/oil circuit, provides for the implementation of at least one of the following optional features, considered separately or in combination.

Preferably, the heat pipes are capillary heat pipes, the condensation section being located radially outwards with respect to the evaporation section, and connected to the latter by an adiabatic area of a heat pipe extending radially outward from the evaporation section towards the condensation section.

Preferably, the heat pipes are circumferentially distributed around a longitudinal central axis of the turbine engine.

Preferably, each of the heat pipes has a U-like general shape, with the two end branches of the U respectively forming the evaporation section and the condensation section.

According to a considered embodiment, for some of said heat pipes, the condensation section is fastened on the inner wall delimiting the air flow path, and for the other ones, the condensation section is fastened on the inner upstream boundary wall of the secondary flow path.

Preferably, the gas generator is indirectly coupled to the fan, via a speed reducer.

Preferably, the generator/motor is arranged axially between the fan and the speed reducer.

Preferably, the rotor of the generator/motor is coupled in rotation to an output member of the speed reducer, this output member of the reducer itself being coupled in rotation to a fan rotary hub.

Preferably, the condensation section of each heat pipe extends over the entire length or substantially the entire length of its associated inner boundary wall.

Preferably, the stator portion of the turbine engine, on which the stator support of the generator/motor is fastened, is a casing on which the inlet guide vanes of the primary flow path are mounted.

Other advantages and features of the invention will appear in the non-limiting detailed description hereinbelow.

BRIEF DESCRIPTION OF THE DRAWINGS

This description will be given with reference to the appended drawings, wherein.

DETAILED DESCRIPTION OF PREFERRED EMBODIMENTS

Figure 1:
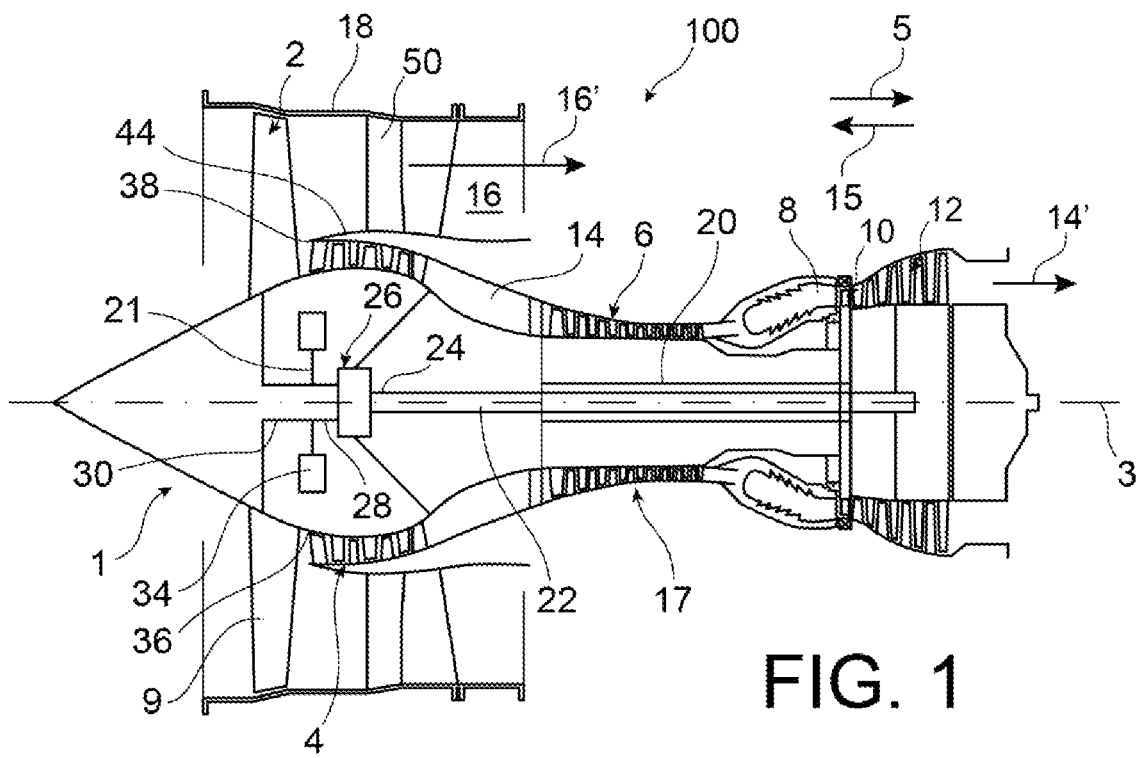
FIG. 1 shows a schematic longitudinal sectional view of a hybrid turbofan engine.

Referring first to FIG. 1, an aircraft turbine engine 100 is shown, herein in the form of a hybrid twin-spool turbofan engine.

The hybrid turbojet engine 100 has a longitudinal axis 3 around which its different components extend. It comprises, from upstream to downstream according to a main direction 5 of gas flow through this turbine engine, a fan 2, a low-pressure compressor 4, a high-pressure compressor 6, a combustion chamber 8, a high-pressure turbine 10 and a low-pressure turbine 12. These elements delimit a primary flow path 14 crossed by a primary flow 14', whereas a secondary flow path 16 surrounds the primary flow path while being delimited on the outside partially by a fan casing 18, and crossed by a secondary air flow 16'. All these elements form, in a conventional manner and more particularly the elements of the primary flow path, a gas generator 17 whose motive thermal power is intended to drive the fan 2 in a manner which will be described hereinafter.

In the following description, the terms "front" and "rear" are considered according to a direction 15 opposite to the main flow direction 5 of the gases within the turbojet engine, and parallel to the axis 3. On the other hand, the terms "upstream" and "downstream" are considered according to this same main flow direction 5.

The high-pressure compressor 6 and the high-pressure turbine 10 are connected by a high-pressure shaft 20 centred on the axis 3. These elements together form a high-pressure spool of the hybrid twin-spool turbofan engine. Similarly, the low-pressure compressor 4 and the low-pressure turbine 12 are connected by a low-pressure shaft 22 also centred on the axis 3, and crossing the high-pressure shaft 20. These elements together form a low-pressure spool of the hybrid turbojet engine 100.

At its front end, the low-pressure shaft 22 is coupled in rotation to an input member 24 of a speed reducer 26. This input member 24 is centred on the axis 3, and it therefore allows indirectly coupling the gas generator 17 to the fan 2. Indeed, this fan 2 includes a fan hub 30 centred on the axis 3 and coupled in rotation to an output member 28 of the reducer 26, this output member 28 also being centred on the axis 3.

The speed reducer 26 may be in any known form, for example by incorporating an epicyclic gear train with its external crown fastened on a stator portion of the turbojet engine. Consequently, the design of this reducer 26 will not be detailed further.

By its hybrid design, the turbojet engine 100 includes, in addition to its gas generator 17, an electric generator/motor 34, centred on the axis 3. The rotor of this generator/motor 34 is coupled in rotation to the output member 28 of the speed reducer 26, and consequently also secured in rotation to the fan rotary hub 30, also called the fan shaft.

For example, the rotational coupling of the rotor of the electric generator/motor 34, with the output member 28 of the speed reducer 26, is achieved using a flange or disc 21 centred on the axis 3, or any other similar element.

The electric generator/motor 34 is arranged axially between the fan 2 and the speed reducer 26, being actually positioned downstream of the vanes of the fan 2, and upstream of the reducer 26. In this particularly advanced axial position, the electric generator/motor 34 is surrounded by an inner boundary wall 36 of an annular air flow path, called total air flow path, because of its upstream location with respect to a flow splitter nozzle 38. Thus, this inner boundary wall 36 of the total air flow path corresponds to an annular segment surrounding the electric generator/motor 34 and arranged between the fan and the flow splitter nozzle 38. In a known manner, it is from this splitter nozzle 38 that the total air flow path is split into two concentric flows, to enter the primary flow path 14 and the secondary flow path 16 respectively.

The inner wall 36 is also located upstream of an annular row of inlet guide vanes 40, or IGV vanes, which are themselves at the inlet of the primary flow path 14, while being very close to the splitter nozzle 38.

Downstream of the inner wall 36, the turbojet engine 100 includes an inner upstream boundary wall 44 of the secondary flow path 16, this wall 44 being located upstream of an annular row of outlet guide vanes 50, or OGV vanes. As shown in FIG. 1, the inner upstream wall 44 starts at the splitter nozzle 38, then extends downstream up to the roots of the outlet guide vanes 50.

In known manner, the electric generator/motor 34 may be used, in a first operating mode, as an electric motor which drives the fan 2 in rotation via its hub 30, and, in a second operating mode, as an electric generator. To drive the fan in rotation in the motor operating mode, the electric generator/motor 34 is powered by an electrical energy storage (not shown), via a dedicated electrical network.

Thanks to the hybrid propulsion resulting from the combination of the gas generator 17 and the electric generator/motor 34, it is possible to perform a purely electric flight in which the fan 2 is driven in rotation by the electric generator/motor 34, while the gas generator 17 remains stopped. A purely thermal flight is also possible, by driving the fan 2 only with the gas generator 17 and the reducer 26, while the electric generator/motor 34 is in the generator operating mode. In this case where the electric generator/motor 34 no longer operates as a motor, but as an electric generator, the rotation of the fan 2 drives the generator 34 which recharges the electrical energy storage.

A hybrid flight is also possible, wherein the fan is driven in rotation by both the gas generator 17 via the reducer 26, and by the generator/motor 34.

Figure 2:
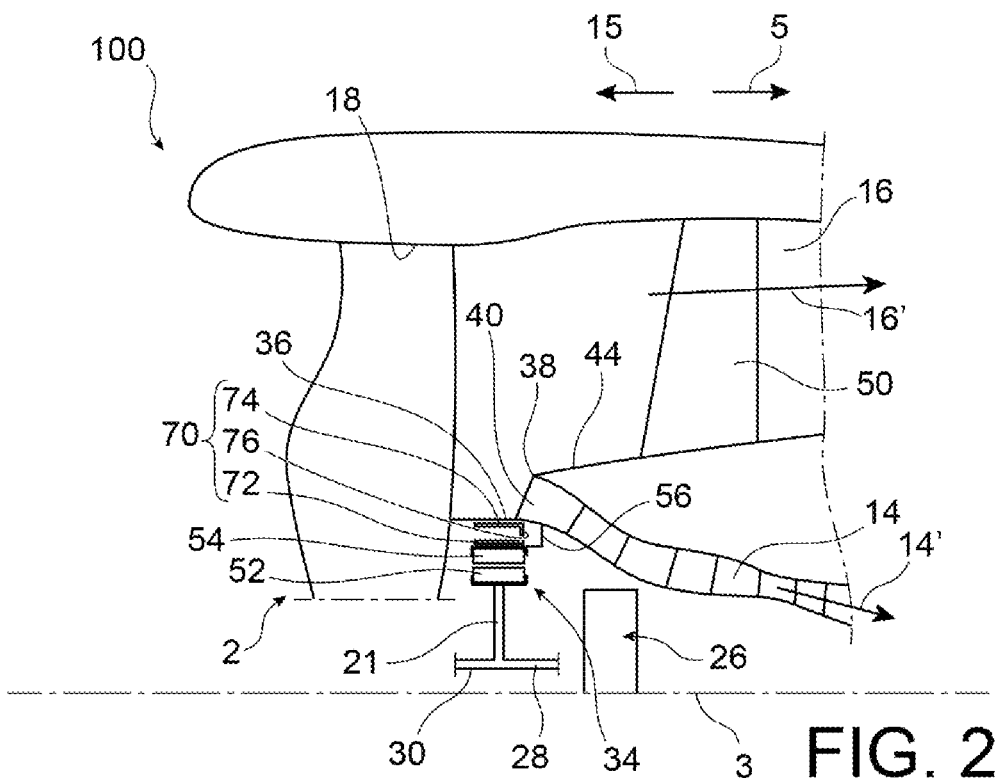
FIG. 2 shows a longitudinal half-sectional view showing a front portion of the hybrid turbojet engine, and incorporating heat pipes specific to the present invention, implemented according to a first preferred embodiment of the invention.
Figure 3:
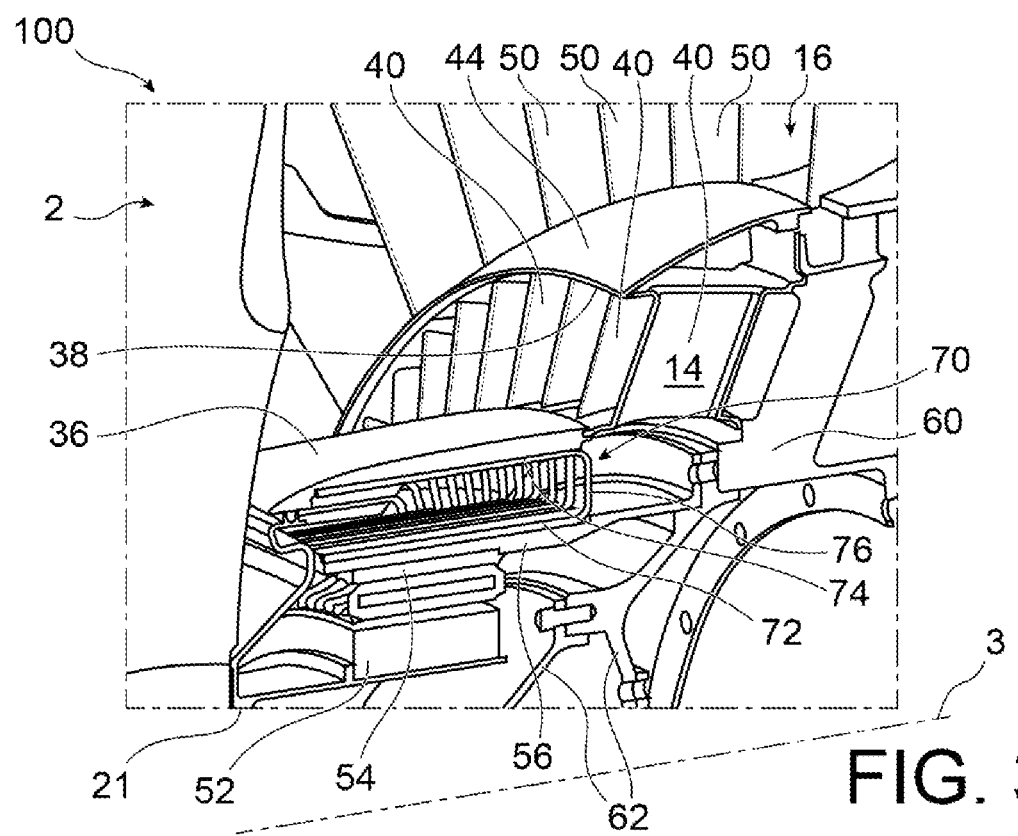
FIG. 3 shows a partial perspective view of the hybrid turbojet engine according to the first preferred embodiment of the invention.

According to a first preferred embodiment shown in FIGS. 2 and 3, the generator/motor 34 is shown in more details, with its internal rotor 52 carried by the flange/disc 21, and its external stator 54 carried by a stator support 56. This stator support 56 has a downstream portion overlapping and axially clamping the stator 52, whereas a downstream portion of this support 56 is fastened on a stator portion of the turbojet engine, herein a casing 60 on which the inlet guide vanes 14 are mounted. For example, this fastening of the support 56 on the casing 60 is achieved by bolts, possibly by providing for clamping therebetween one or more support/fastening flange(s) 62, intended for example to cooperate with the components of the speed reducer, and/or with the fan hub 30 to enable the rotational guidance thereof.

To ensure the thermal management of the generator/motor 34 capable of releasing a large amount of heat, the invention provides for associating with this electrical component 34 a plurality of heat pipes 70 for cooling thereof. The heat pipes 70 are distributed circumferentially so as to form an annular row centred on the axis 3, and provided in a large number, which could exceed several tens, and even several hundreds.

In this first preferred embodiment, each heat pipe 70 include an evaporator section 72 forming an end portion, externally fastened on the stator support 56 of the electric generator/motor 34. The evaporation section 72, with a rectilinear or substantially rectilinear shape, thus extends axially over a large portion of the external surface of the stator support 56, yet without extending beyond the splitter nozzle 38 downstream in the axial direction.

Each heat pipe 70 also includes a condensation section 74 forming an opposite end portion, internally fastened on the inner boundary wall 36 of the annular air flow path. Herein again, the condensation section 74, with a rectilinear or substantially rectilinear shape, extends axially over the entire length or substantially the entire length of the internal surface of the inner boundary wall 36.

Thus, each heat pipe 70 is in the form of a tube with two end portions located at a distance from each other and not being connected to each other. Hence, these opposite end portions of the tube are respectively formed by the condensation section 74 and by the evaporation section 72.

To connect these two sections 72, 74, each heat pipe 70 includes an adiabatic area 76 extending radially outwards from the evaporation section 72 towards the condensation section 74. The two sections 72, 74 are arranged so as to radially overlap each other, while remaining spaced apart according to the radial direction, so as to form with the adiabatic area 76 a wired heat pipe with a U-like general shape, preferably with the hollow of the U-like shape open upstream.

The capillary heat pipes 70 are individual, following each other according to the circumferential direction, or else they are arranged within the same annular wall integrating several heat pipes connected to each other. Each of the heat pipes 70 has an identical or substantially identical design.

As examples, these consist of capillary heat pipes of the "Oscillating/Pulsating Heat Pipes" or "Loop Heat Pipes" type.

Figure 4:
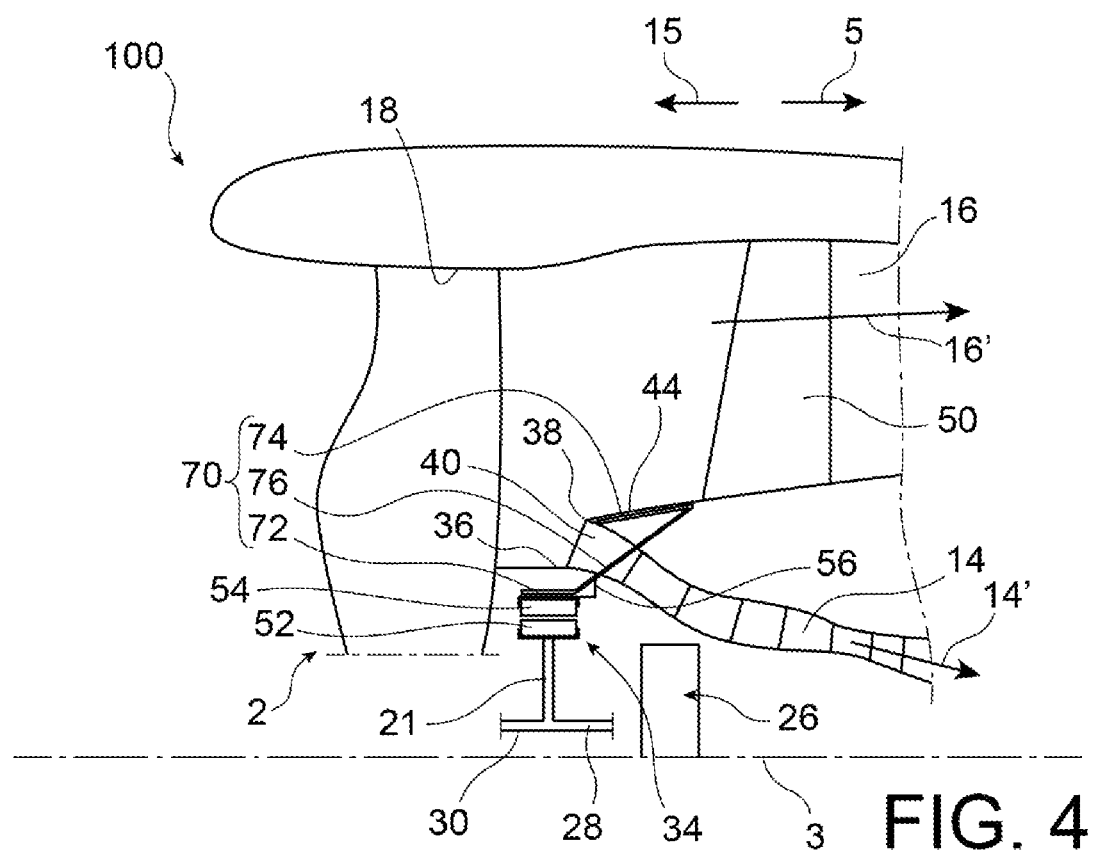
FIG. 4 shows a longitudinal half-sectional view similar to that of FIG. 2, with the turbojet engine in the form of a second preferred embodiment of the invention.

The capillary heat pipes 70 are high-performance heat dissipation devices, which herein allow extracting heat from the generator/motor 34 to transfer it to the total air flow path upstream of the splitter nozzle 38, thereby forming an area that is particularly cold and therefore effective for thermal management of the generator/motor 34. Indeed, each heat pipe 70 allows evacuating high heat flux densities between two media at different temperatures, herein the generator/motor 34 and the inner boundary wall 36. This energy transfer o takes place via a heat-transfer fluid in a saturated state, like water. The latter, in the liquid state, evaporates at the heating area corresponding to the evaporation section 72 running along the stator support 56. The vapour, thus formed, flows through the adiabatic area 76 to condense in the condensation section 74, running along the inner boundary wall 36. Thus, by taking advantage of the phase changes of the heat-transfer fluid, the heat pipe 70 allows drawing heat at the electric generator/motor 34, and redistributing it in the inner boundary wall 36 externally licked by a cold air flow. According to a second preferred embodiment shown in FIG. 4, the heat pipes 70 differ from those of the first embodiment in that their condensation section 74 now extends along the internal surface of the inner upstream boundary wall 44 of the secondary flow path 16. Herein again, the condensation section 74, with a rectilinear or substantially rectilinear shape, extends axially over the entire length or substantially the entire length of the internal surface of the inner upstream boundary wall 44. Therefore, the adiabatic area 76 connecting the two sections 72, 74 has an inclined orientation with respect to the radial direction, so as to extend axially downstream while deviating radially outwards.

This results in a still U-like general shape for the heat pipe 70, even though this U-like shape no longer has any perpendicularity between its base formed by the adiabatic area 76, and its two end branches formed respectively by the two sections 72, 74.

Preferably, each adiabatic area 76 crosses the primary flow path 14 by crossing the inside of one of the inlet guide vanes 40.

Figure 5:
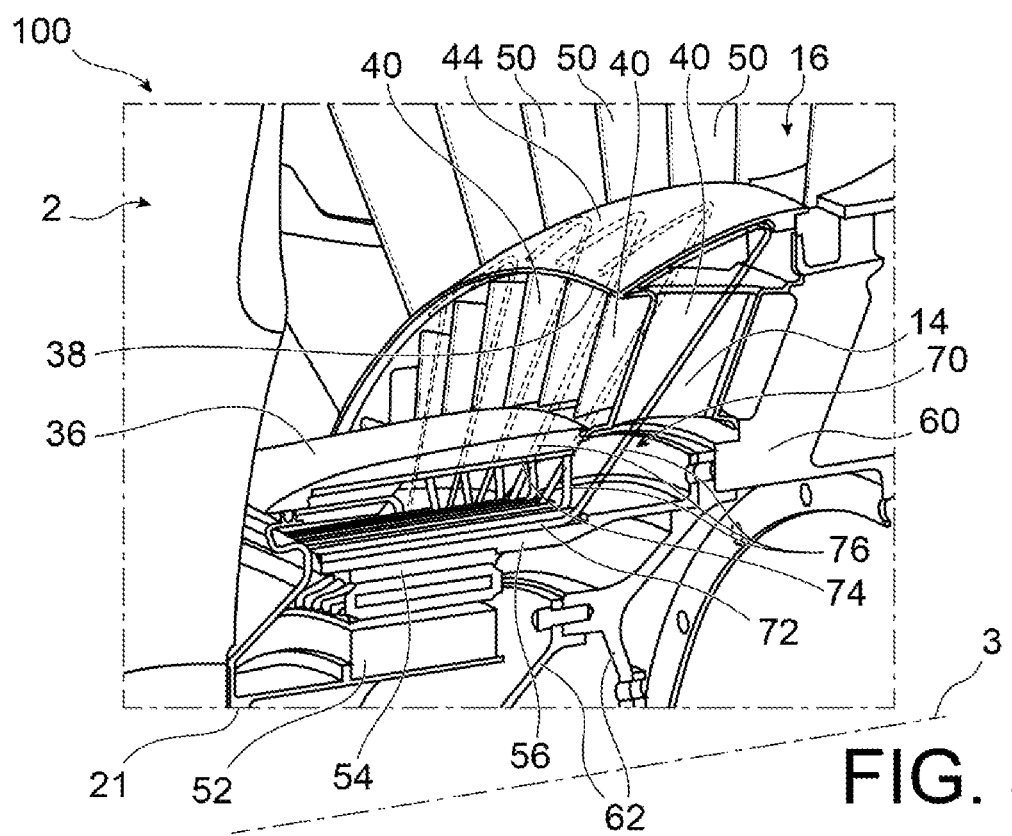
FIG. 5 shows a partial perspective view similar to that of FIG. 3, with the turbojet engine in the form of a third preferred embodiment of the invention.

According to a third preferred embodiment of the invention, shown in FIG. 5, the two embodiments described before are combined. Indeed, the annular row of heat pipes 70 is formed by heat pipes whose condensation section 74 is fastened on the inner wall 36, and by other heat pipes whose condensation section 74 is fastened on the inner upstream wall 44. A possible arrangement consists in placing these two types of heat pipes 70 alternately according to the circumferential direction, as shown in FIG. 5.

Of course, various modifications can be made by a person skilled in the art to the invention that has just been described, only as non-limiting examples, and within the limit of the scope defined by the appended claims.

The invention claimed is:

1. A hybrid turbine engine for an aircraft, comprising a fan, an electric generator/motor, and a gas generator comprising a combustion chamber, the hybrid turbine engine being designed so that the rotation of the fan is ensured by the electric generator/motor and/or by the gas generator, the hybrid turbine engine comprising a flow splitter nozzle from which extend, downstream, a primary flow path equipped at an inlet of the primary flow path with inlet guide vanes, and a secondary flow path equipped with outlet guide vanes, the hybrid turbine engine comprising, between the fan and the flow splitter nozzle, an inner boundary wall of an air flow path, located upstream of the inlet guide vanes of the primary flow path, and also comprising, upstream of the outlet guide vanes, an inner upstream boundary wall of the secondary flow path, the electric generator/motor including a rotor, and a stator carried by a stator support fastened to a stator portion of the hybrid turbine engine, wherein the hybrid turbine engine further includes a plurality of heat pipes for cooling the electric generator/motor, each heat pipe including an evaporator section fastened on the stator support of the electric generator/motor, as well as a condensation section fastened on the inner boundary wall of the air flow path or on the inner upstream boundary wall of the secondary flow path, each heat pipe being in the form of a tube whose opposite end portions are respectively formed by the condensation section and by the evaporation section, wherein the stator is radially outward from the rotor and the heat pipes are radially outward from the stator.

2. The hybrid turbine engine according to claim 1, wherein the plurality of heat pipes are capillary heat pipes, the condensation section being located radially outwards with respect to the evaporation section, and connected to the latter by an adiabatic area of the heat pipe extending radially outward from the evaporation section towards the condensation section.

3. The hybrid turbine engine according to claim 2, wherein the plurality of heat pipes are circumferentially distributed around a longitudinal central axis of the hybrid turbine engine.

4. The hybrid turbine engine according to claim 1, wherein each of the plurality of heat pipes are formed to have end branches respectively forming the evaporation section and the condensation section.

5. The hybrid turbine engine according to claim 1, wherein for at least one of said plurality of heat pipes, the condensation section is fastened on the inner boundary wall of the air flow path, and for at least one of said plurality of heat pipes, the condensation section is fastened on the inner upstream boundary wall of the secondary flow path.

6. The hybrid turbine engine according to claim 1, wherein the gas generator is indirectly coupled to the fan, via a speed reducer.

7. The hybrid turbine engine according to claim 6, wherein the electric generator/motor is arranged axially between the fan and the speed reducer.

8. The hybrid turbine engine according to claim 7, wherein the rotor of the electric generator/motor is coupled in rotation to an output member of the speed reducer, the output member of the speed reducer being coupled in rotation to a fan rotary hub.

9. The hybrid turbine engine according to claim 1, wherein a length of the condensation section of each heat pipe is equal to an entire length or substantially the entire length of the inner boundary wall of the air flow path or on the inner upstream boundary wall of the secondary flow path.

10. The hybrid turbine engine according to claim 1, wherein the stator portion of the hybrid turbine engine, on which the stator support of the electric generator/motor is fastened, is a casing on which the inlet guide vanes of the primary flow path are mounted.

* * * * *